(12) United States Patent
Roth

(10) Patent No.: US 8,826,889 B2
(45) Date of Patent: Sep. 9, 2014

(54) PRESSURE REGULATING VALVE FOR REGULATING THE PRESSURE IN A HIGH-PRESSURE RESERVOIR

(75) Inventor: Brigitte Roth, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 759 days.

(21) Appl. No.: 12/809,922

(22) PCT Filed: Nov. 24, 2008

(86) PCT No.: PCT/EP2008/066054
§ 371 (c)(1),
(2), (4) Date: Jun. 21, 2010

(87) PCT Pub. No.: WO2009/080426
PCT Pub. Date: Jul. 2, 2009

(65) Prior Publication Data
US 2010/0269792 A1 Oct. 28, 2010

(30) Foreign Application Priority Data

Dec. 21, 2007 (DE) .......................... 10 2007 062 176

(51) Int. Cl.
*F02M 69/54* (2006.01)
*F02M 63/02* (2006.01)
*F02M 63/00* (2006.01)
*F16K 31/06* (2006.01)
*G05D 16/20* (2006.01)
*F02M 59/36* (2006.01)

(52) U.S. Cl.
CPC ........... *F02M 63/025* (2013.01); *F02M 63/026* (2013.01); *F02M 63/0015* (2013.01); *F16K 31/0665* (2013.01); *G05D 16/2013* (2013.01);
*F16K 31/0679* (2013.01); *F02M 63/0063* (2013.01); *F02M 63/0052* (2013.01)
USPC ........................................... 123/458; 123/514

(58) Field of Classification Search
USPC ......... 123/458, 457, 514, 463, 456, 447, 459, 123/499; 251/129.02, 129.09, 129.15, 251/129.16, 129.1; 137/535, 538
See application file for complete search history.

(56) References Cited

U.S. PATENT DOCUMENTS

| 3,851,635 | A | * | 12/1974 | Murtin et al. | ................. | 123/448 |
| 4,165,762 | A | * | 8/1979 | Acar | .......................... | 137/625.5 |
| 4,342,443 | A | * | 8/1982 | Wakeman | ............... | 251/129.08 |
| 5,494,219 | A | * | 2/1996 | Maley et al. | .................... | 239/88 |
| 5,570,721 | A | * | 11/1996 | Funke et al. | ............. | 137/625.65 |
| 6,036,120 | A | | 3/2000 | Varble et al. | | |
| 6,065,684 | A | | 5/2000 | Varble et al. | | |

(Continued)

FOREIGN PATENT DOCUMENTS

| CN | 1780979 A | 5/2006 |
| DE | 10319285 B3 | 9/2004 |

(Continued)

*Primary Examiner* — Mahmoud Gimie
(74) *Attorney, Agent, or Firm* — Michael Best & Friedrich LLP

(57) ABSTRACT

The invention relates to a machine tool having working field illumination disposed in a housing, having an illumination mechanism and a transparent element which allows the light from the illumination mechanism to be led out toward the working field. A light beam can be deflected between the illumination mechanism and the transparent element. According to the invention, the transparent element forms a region of the housing.

17 Claims, 2 Drawing Sheets

(56) References Cited

U.S. PATENT DOCUMENTS

| | | |
|---|---|---|
| 2002/0092503 A1 | 7/2002 | Ricco |
| 2005/0022791 A1 | 2/2005 | Braeuer et al. |
| 2006/0042599 A1* | 3/2006 | Frank et al. ............... 123/458 |
| 2007/0175436 A1 | 8/2007 | Grundl et al. |

FOREIGN PATENT DOCUMENTS

| | | |
|---|---|---|
| EP | 1219828 A2 | 7/2002 |
| EP | 1557597 A1 | 7/2005 |
| JP | 2005344636 A | 12/2005 |
| JP | 2006524771 A | 11/2006 |

\* cited by examiner

PRESSURE REGULATING VALVE FOR REGULATING THE PRESSURE IN A HIGH-PRESSURE RESERVOIR

CROSS-REFERENCE TO RELATED APPLICATION

This application is a 35 USC 371 application of PCT/EP2008/066054 filed on Nov. 24, 2008.

BACKGROUND OF THE INVENTION

1. Field of the Invention

The invention relates to a pressure regulating valve for regulating the pressure in a high-pressure reservoir of an internal combustion engine, in particular in common rail injection systems.

The invention also relates to a fuel system of an internal combustion engine, in particular of a common rail injection system, as generically defined by the preamble to claim 10.

2. Description of the Prior Art

From German Patent Disclosure DE 10 2005 052 636 A1, a fuel system is known which includes a feed pump that feeds fuel from a fuel tank. From the feed pump, via an adjusting device called a metering unit, the fuel reaches a high-pressure fuel pump, which compresses the fuel and supplies a high-pressure reservoir ("rail"). A plurality of fuel injectors are connected to the high-pressure reservoir. The pressure in the high-pressure reservoir is adjusted, among other ways, by means of a pressure regulating valve (diversion valve). The fuel diverted from the high-pressure reservoir is in general returned to a fuel tank.

The basic function of pressure regulating valves is to enable pressure regulation in the high-pressure reservoir, or rail pressure regulation, in various modes of regulation, and to ensure pressure limitation as a safety function, to preclude risk to humans and the environment. In cases in which there is a control unit or power supply failure, the safety function should still be ensured, in the form of a pressure limitation in the high-pressure reservoir.

From the general prior art, two different types of pressure regulating valves are known for diverting fuel from the high-pressure reservoir and thus for adjusting the pressure in the high-pressure reservoir. These pressure regulating valves are distinguished from one another in that they are either open or closed when without current.

Pressure regulating valves that are open when without current are as a rule used in passenger cars, while pressure regulating valves that are closed when without current are used in utility vehicles.

The pressure regulating valves that are open when without current are designed such that they are actuated by triggering of a magnet coil, so that the pressure in the high-pressure reservoir is adjusted to a desired value by diverting fuel from the high-pressure reservoir. If there is a failure of the control unit or the power supply, the pressure regulating valve is opened, so that fuel is diverted from the high-pressure reservoir. Thus even in failure situations, the safety function of the pressure limitation in the high-pressure reservoir is ensured by the pressure regulating valve. However, the disadvantage of this construction is that when there is a power loss, for instance from cable breakage caused by damage from martens, no further rail pressure can be built up, and the engine or motor will no longer work. Hence an emergency operation function (so-called limp home functionality) is thus unattainable.

In pressure regulating valves for common rail injection systems that are closed when without current, the direction of action is the reverse compared to the pressure regulating valves that are open when without current. In pressure regulating valves that are closed when without current, it is provided that the pressure regulating valve is closed in the currentless state up to system pressure (plus tolerance) via a strong spring. The pressure regulation, that is, the opening of the pressure regulating valve so that pressure can be diverted from the high-pressure reservoir, is effected via a magnet force that acts counter to the closing force of the spring. Supplying current to a magnet coil reduces the closing force of the pressure regulating valve or acts counter to the spring force, as a result of which the pressure in the high-pressure reservoir, or rail pressure, can be regulated to the desired level. In case of a failure, that is, a control unit or power supply failure, rail pressure can thus continue to be built up, and the emergency operation functionality can be ensured.

The safety function of the pressure limitation is intended to be attained by the spring force, in the pressure regulating valves that are closed when without current. The spring force is adjusted to the maximum allowable system pressure in the high-pressure reservoir, optionally plus tolerance. In experiments and simulations, however, it is found that the rail pressure, or the pressure in the high-pressure reservoir, that is established in the currentless state is strongly dependent on the flow rate. In control unit or power supply failures, the system pressure rises, as a function of the flow rate, past the allowable maximum system pressure. This can lead to component damage and can endanger humans and the environment. Moreover, the temperatures in the fuel return of the pressure regulating valve rise to values over 200° C.

ADVANTAGES AND SUMMARY OF THE INVENTION

Because a second magnet device whose force reinforces the spring force is provided, a weaker spring can be used. In the case of a power loss or a control unit failure, the closing force of the spring can thus be overcome by the rising rail pressure, that is, the rising pressure in the high-pressure reservoir, before a maximum allowable system pressure in the high-pressure reservoir is reached. Component damage and danger to humans and the environment are thus averted. Moreover, an excessive increase in the temperatures in the fuel return of the pressure regulating valve are avoided.

The use of a spring makes it possible, when a power loss occurs, for rail pressure to continue to be built up at the pressure regulating valve, and the emergency operation functionality is thus ensured.

Because two oppositely acting magnet devices in conjunction with a weaker spring are used, instead of one magnet device that closes the pressure regulating valve or its valve piston, the advantages of the two previously known types of pressure regulating valves can be combined with one another, without having to take their disadvantages into the bargain as well.

The mechanical opening pressure (currentless state) can preferably be in the medium pressure range of the system. The force of the first magnet device acts counter to the spring force, so that with the pressure regulating valve, rail pressures in the range from 0 bar up to the mechanical opening pressure of the spring can be regulated.

The force of the second magnet device reinforces the spring force. Thus rail pressures between the mechanical opening pressure of the spring up to the maximum system pressure can advantageously be regulated.

By means of an intelligent current control by means of the control and regulating device or control unit, a constant pressure rise/drop can be attained.

Even in the instances of "control unit failure" or "power supply failure", the rail pressure remains within the operating range.

In an advantageous feature of the invention, it is provided that the magnet devices are embodied as magnet coils.

The embodiment according to the invention makes it possible to regulate pressure for common rail injection systems, especially in utility vehicles, within the entire regulating range in various modes of regulation. The embodiment of the invention likewise ensures a limp-home functionality of the utility vehicles, while the maximum system pressure does not rise beyond the allowable range.

One exemplary embodiment of the invention is described in principle below, in conjunction with the drawings.

BRIEF DESCRIPTION OF THE DRAWINGS

One exemplary embodiment of the invention is described in principle below, in conjunction with the drawings, in which.

DESCRIPTION OF THE PREFERRED EMBODIMENT

Figure 1:
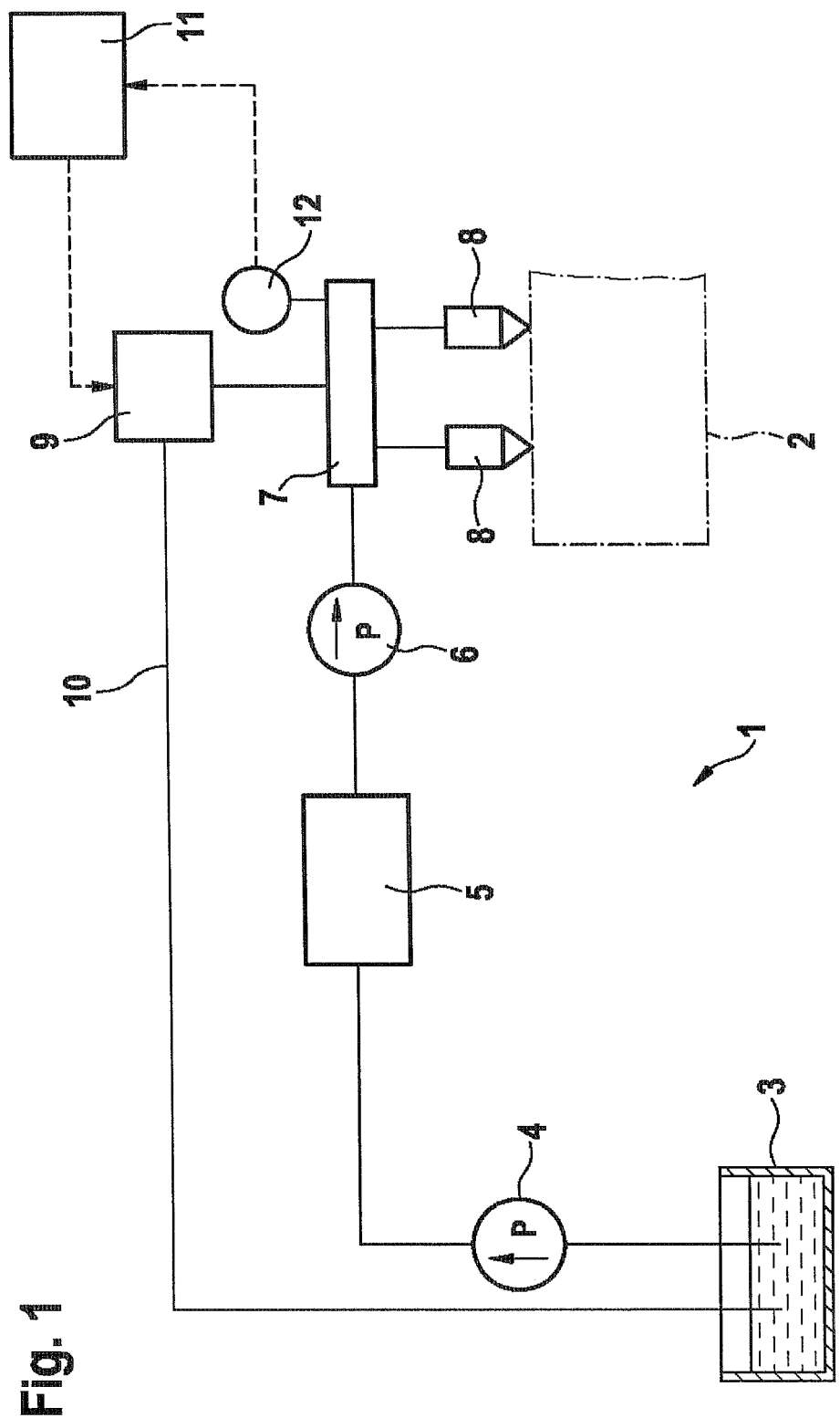
FIG. 1 shows a basic sketch of a fuel system of an internal combustion engine.

FIG. 1 shows a fuel system 1 that is used to supply an internal combustion engine 2. The engine 2 is indicated only schematically in FIG. 1 by a dot-dashed line.

The fuel system 1 includes a fuel tank 3, from which a typically electrically operated feed pump 4 pumps the fuel to an adjusting device 5, which is also called a metering unit. From the adjusting device 5, the fuel is pumped to a high-pressure fuel pump 6 driven mechanically by the engine 2. The high-pressure fuel pump 6 compresses the fuel to a very high pressure and pumps it into a high-pressure reservoir 7, also known as a "rail". A plurality of injectors 8 are connected to the high-pressure reservoir 7 and inject the fuel into combustion chambers, not shown, of the engine 2. A pressure regulating valve 9 of the invention is connected to the high-pressure reservoir 7 and will be described in detail below in conjunction with FIG. 2. From the pressure regulating valve 9, a diversion line 10 leads back to the fuel tank 3.

The operation of the fuel system 1 is controlled or regulated by a control and regulating device 11. This is generally also known as a "control unit". The control unit 11 receives signals from a pressure sensor 12, which detects the pressure in the high-pressure reservoir 7. As a function of the signals of the pressure sensor 12, the control unit 11 controls or regulates the pressure regulating valve 9, among other elements.

Figure 2:
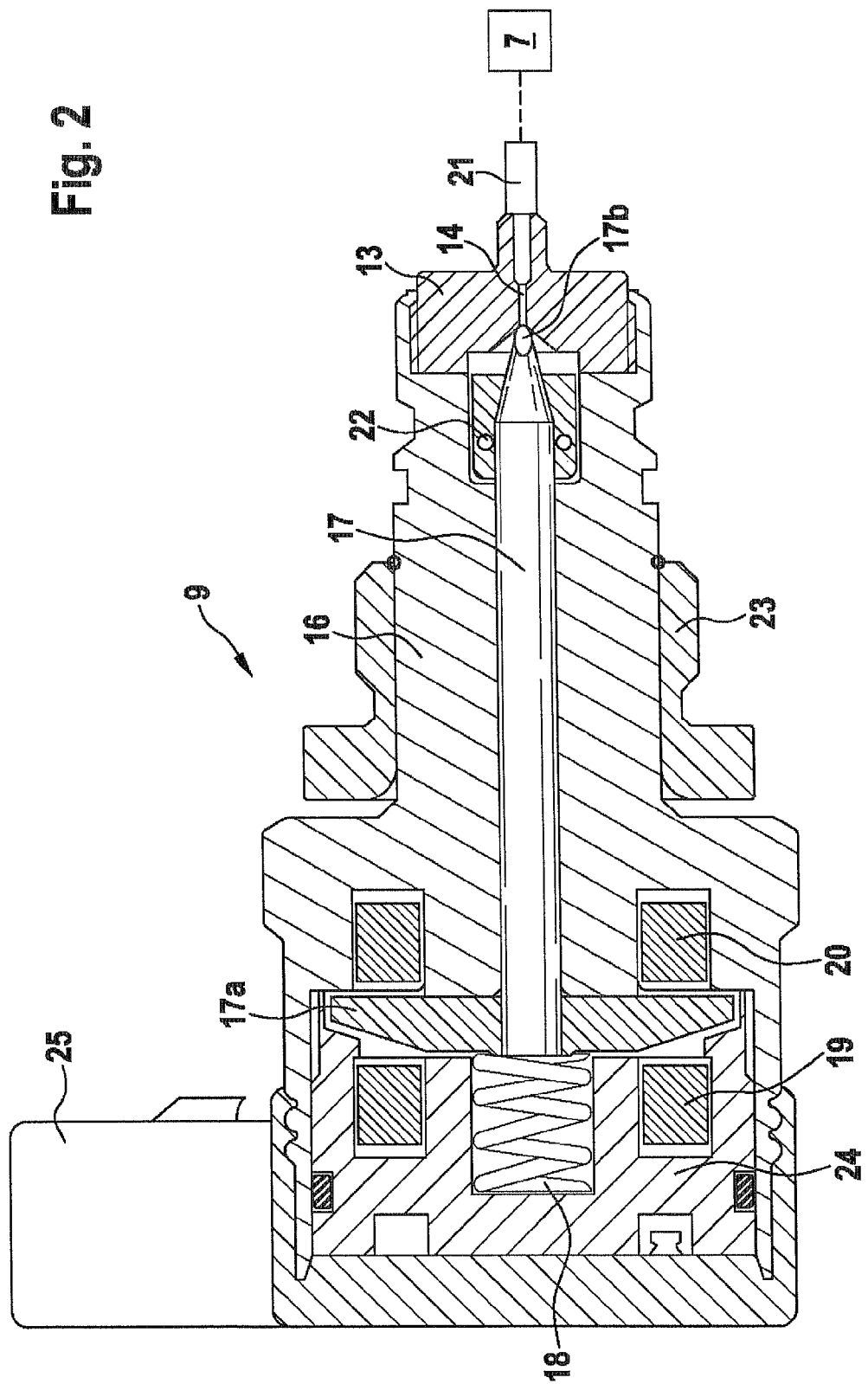
FIG. 2 shows a sectional view of the pressure regulating valve of the invention.

The pressure regulating valve 9 shown in FIG. 2 is embodied as a high-pressure regulating valve for regulating the pressure in the high-pressure reservoir 7 of the engine 2.

The pressure regulating valve 9 is particularly suitable for use in common rail injection systems, especially in utility vehicles.

For regulating the diversion of fuel from the high-pressure reservoir 7, the pressure regulating valve 9 is connected to the high-pressure reservoir (see also FIG. 1).

Since the basic construction of a pressure regulating valve 9 is known from the prior art, only those characteristics essential to the invention will be addressed in detail below.

The pressure regulating valve 9 has a valve seat 13 with a valve bore 14, by way of which bore the pressure regulating valve 9, for diverting fuel, is connected to the high-pressure reservoir 7. The opening of the valve bore 14 is varied (increased or decreased), for regulating the quantity of fuel to be diverted, by means of a valve piston 17 supported movably in a valve housing 16.

The valve piston 17 is urged in the closing direction, counter to the pressure in the high-pressure reservoir 7, by a spring force of a spring 18. In the exemplary embodiment, the spring 18 is embodied as a compression spring.

In addition, two magnet devices 19, 20 that are controllable by the control unit 11 are provided. The first magnet device 19 generates a force which acts on the spring piston counter to the spring force. The second magnet device 20 generates a force which reinforces the spring force, that is, acts accordingly on the valve piston 17.

It is provided that the spring force of the spring 18 is less than the force acting in the opposite direction on the valve piston 17 upon attainment of the allowable system pressure in the high-pressure reservoir 7.

In the exemplary embodiment, the spring force of the spring 18 is equivalent to the force which acts in the opposite direction on the valve piston 17 in the medium pressure range in the high-pressure reservoir 7.

It is also provided that by means of the first magnet device 19, a force can be generated which is at least equivalent to the spring force. It is further provided that by means of the second magnet device 20, a force can be generated which together with the spring force is equivalent to the force acting in the opposite direction the valve piston 17 upon attainment of the allowable system pressure in the high-pressure reservoir 7.

In the exemplary embodiment, it is provided that for regulating the pressure in the high-pressure reservoir, or in other words regulating the diversion of fuel from the high-pressure reservoir 7, both magnet devices 19, 20 are controllable or regulatable by the control unit 11.

As seen from FIG. 2, the valve piston 17 in the exemplary embodiment is embodied as an armature bolt 17 with an armature plate 17a. The armature plate 17a is disposed (displaceably) between the first and second magnet devices 19 and 20.

The magnet devices 19, 20 are embodied in the exemplary embodiment as magnet coils.

For closing the valve bore 14, the tip of the armature bolt 17 is embodied as a ball tip 17b.

In FIG. 2, in a known manner, a filter 21 (in the flow direction upstream of the valve bore 14), return flow openings 22 (which lead to the diversion line 10), a flange screw 23, a valve cap 24, and a connector 25 are shown, whose modes of operation are well known from the prior art.

The embodiment according to the invention is not limited to the fuel system shown and to the embodiment of the pressure regulating valve shown. On the contrary, the pressure regulating valve can also have structurally different layout in which it is ensured that the closing force of the pressure regulating valve, generated by a spring, acts counter to the force of a first magnet device, while the force of a second magnet device reinforces the closing force of the spring.

The embodiment according to the invention is moreover not limited to use in utility vehicles; instead, it can be employed in passenger cars as well, or in other systems in which a pressure regulating valve, in particular a high-pressure regulating valve, is needed (such as generator motors, passenger cars, marine applications, power plant applications, and so forth).

The foregoing relates to the preferred exemplary embodiment of the invention, it being understood that other variants and embodiments thereof are possible within the spirit and scope of the invention, the latter being defined by the appended claims.

What is claimed is:

1. A pressure regulating valve for regulating pressure in a high-pressure reservoir of an internal combustion engine, in which the pressure regulating valve can be connected to the high-pressure reservoir, the pressure regulating valve comprising:
    a valve piston which is urged in a closing direction by a spring force of a spring, counter to the pressure in the high-pressure reservoir;
    a controllable first magnet device whose force acts on the valve piston counter to the spring force; and
    a second magnet device whose force reinforces the spring force on the valve piston, wherein the spring force of the spring is less than the force acting in an opposite direction on the valve piston upon attainment of an allowable system pressure in the high-pressure reservoir.

2. The pressure regulating valve as defined by claim 1, wherein the spring force of the spring is equivalent to the force which acts in the opposite direction on the valve piston in a medium pressure range in the high-pressure reservoir.

3. The pressure regulating valve as defined by claim 1, wherein by means of the first magnet device, a force can be generated which is at least equivalent to the spring force.

4. The pressure regulating valve as defined by claim 2, wherein by means of the first magnet device, a force can be generated which is at least equivalent to the spring force.

5. The pressure regulating valve as defined by claim 1, wherein by means of the second magnet device, a force can be generated which together with the spring force is equivalent to the force acting in the opposite direction on the valve piston upon attainment of an allowable system pressure in the high-pressure reservoir.

6. The pressure regulating valve as defined by claim 2, wherein by means of the second magnet device, a force can be generated which together with the spring force is equivalent to the force acting in the opposite direction on the valve piston upon attainment of the allowable system pressure in the high-pressure reservoir.

7. The pressure regulating valve as defined by claim 4, wherein by means of the second magnet device, a force can be generated which together with the spring force is equivalent to the force acting in the opposite direction on the valve piston upon attainment of the allowable system pressure in the high-pressure reservoir.

8. The pressure regulating valve as defined by claim 1, wherein for regulating the pressure in the high-pressure reservoir, both magnet devices are controllable or regulatable by means of a control and regulating device.

9. The pressure regulating valve as defined by claim 7, wherein for regulating the pressure in the high-pressure reservoir, both magnet devices are controllable or regulatable by means of a control and regulating device.

10. The pressure regulating valve as defined by claim 1, wherein the valve piston is embodied as an armature bolt with an armature plate, which plate is disposed between the first magnet device and the second magnet device.

11. The pressure regulating valve as defined by claim 9, wherein the valve piston is embodied as an armature bolt with an armature plate, which plate is disposed between the first magnet device and the second magnet device.

12. The pressure regulating valve as defined by claim 1, wherein the magnet devices are embodied as magnet coils.

13. The pressure regulating valve as defined by claim 11, wherein the magnet devices are embodied as magnet coils.

14. The pressure regulating valve as defined by claim 1, wherein the spring is a compression spring.

15. The pressure regulating valve as defined by claim 13, wherein the spring is a compression spring.

16. A fuel system of an internal combustion engine, having a high-pressure reservoir from which fuel can be diverted back to a fuel tank, wherein for regulating the diversion of fuel from the high-pressure reservoir, a pressure regulating valve as defined by claim 1 is used.

17. A fuel system of an internal combustion engine, having a high-pressure reservoir from which fuel can be diverted back to a fuel tank, wherein for regulating the diversion of fuel from the high-pressure reservoir, a pressure regulating valve as defined by claim 15 is used.

* * * * *